(12) United States Patent
Hamrin et al.

(10) Patent No.: US 8,814,739 B1
(45) Date of Patent: Aug. 26, 2014

(54) CONTINUOUSLY VARIABLE TRANSMISSION WITH AN AXIAL SUN-IDLER CONTROLLER

(71) Applicant: TEAM Industries, Inc., Bagley, MN (US)

(72) Inventors: John E. Hamrin, Bemidji, MN (US); Bruce H. Younggren, Bemidji, MN (US); Joel Dunlap, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 13/828,902

(22) Filed: Mar. 14, 2013

(51) Int. Cl.
*F16H 13/08* (2006.01)
*F16H 15/50* (2006.01)

(52) U.S. Cl.
CPC ..................................... *F16H 15/50* (2013.01)
USPC ........................................... 475/189; 475/195

(58) Field of Classification Search
CPC .......... F16H 13/08; F16H 13/14; F16H 15/52
USPC ................... 475/189, 190, 191, 195, 196, 197
See application file for complete search history.

(56) References Cited

U.S. PATENT DOCUMENTS

| | | | |
|---|---|---|---|
| 2,526,435 A | 10/1950 | Teigman | |
| 2,727,396 A | 12/1955 | Haugwitz | |
| 4,270,415 A | 6/1981 | Dickinson et al. | |
| 4,345,486 A * | 8/1982 | Olesen | 475/189 |
| 4,391,156 A | 7/1983 | Tibbals, Jr. | |
| 6,120,399 A | 9/2000 | Okeson et al. | |
| 6,322,475 B2 | 11/2001 | Miller | |
| 6,569,043 B2 | 5/2003 | Younggren et al. | |
| 6,733,406 B2 | 5/2004 | Kitai et al. | |
| 6,813,553 B2 * | 11/2004 | Nakamura et al. | 701/70 |
| 7,074,154 B2 | 7/2006 | Miller | |
| 7,204,777 B2 * | 4/2007 | Miller et al. | 475/189 |
| 7,581,467 B2 | 9/2009 | Peterman et al. | |
| 7,727,106 B2 | 6/2010 | Maheu et al. | |
| 7,762,919 B2 | 7/2010 | Smithson et al. | |
| 7,762,920 B2 | 7/2010 | Smithson et al. | |

(Continued)

FOREIGN PATENT DOCUMENTS

WO   WO 02/088573 A2   11/2002

OTHER PUBLICATIONS

Model N360 NuVinci® CVP, Bicycle Drivetrain. Fallbrook Technologies Inc. 2010, 2 pages.

(Continued)

*Primary Examiner* — Edwin A Young
(74) *Attorney, Agent, or Firm* — IPLM Group, P.A.

(57) ABSTRACT

A continuously variable transmission includes an input assembly. The input assembly coupled to receive input rotational motion. An output assembly is used to provide a rotational output and is coupled to a load. Moreover, an input/output planetary ratio assembly sets an input to output speed ratio between the input assembly and the output assembly. An input speed feedback control assembly is used to provide an axial speed force in response to a rotation from the input assembly on a shift rod. A torque feedback control assembly is used to provide an axial load force on the shift rod in an opposite direction from the axial speed force in response to a torque of a load coupled to the output assembly. In addition, a shifting member is coupled to the shift rod. The shifting member controls the input/output planetary ratio assembly based on a position of the shift rod.

20 Claims, 14 Drawing Sheets

(56) References Cited

U.S. PATENT DOCUMENTS

| | | |
|---|---|---|
| 7,770,674 B2 | 8/2010 | Miles et al. |
| 7,963,880 B2 | 6/2011 | Smithson et al. |
| 7,976,426 B2 | 7/2011 | Smithson et al. |
| 8,087,482 B2 | 1/2012 | Miles et al. |
| 8,360,917 B2 | 1/2013 | Nichols et al. |
| 8,496,551 B2 | 7/2013 | Mueller et al. |
| 8,585,528 B2 | 11/2013 | Carter et al. |
| 8,668,623 B2 | 3/2014 | Vuksa et al. |
| 2002/0123400 A1 | 9/2002 | Younggren et al. |
| 2004/0171452 A1 | 9/2004 | Miller et al. |
| 2007/0270265 A1 | 11/2007 | Miller et al. |
| 2007/0270267 A1* | 11/2007 | Miller et al. .......... 475/189 |
| 2007/0270272 A1 | 11/2007 | Miller et al. |
| 2007/0270278 A1 | 11/2007 | Miller et al. |
| 2009/0164076 A1 | 6/2009 | Vasiliotis et al. |
| 2010/0056322 A1 | 3/2010 | Thomassy |
| 2010/0093480 A1 | 4/2010 | Pohl et al. |
| 2010/0267510 A1 | 10/2010 | Nichols et al. |
| 2010/0314184 A1 | 12/2010 | Stenberg et al. |
| 2011/0034284 A1 | 2/2011 | Pohl et al. |
| 2011/0088503 A1 | 4/2011 | Armstrong et al. |
| 2011/0092325 A1 | 4/2011 | Vuksa et al. |
| 2011/0172050 A1 | 7/2011 | Nichols et al. |
| 2011/0220453 A1 | 9/2011 | Mueller et al. |
| 2012/0115667 A1 | 5/2012 | Lohr et al. |
| 2012/0238386 A1 | 9/2012 | Pohl et al. |

OTHER PUBLICATIONS

NuVinci Deltaseries Supercharger Drive. Fallbrook Technologies Inc. 2012, 2 pages.

NuVinci® N360 CVP Drivetrain Owner's Manual. Fallbrook Technologies Inc. Jul. 2010, 6 pages.

NuVinci® Parts Catalog, NuVinci N360 and NuVinci Harmony Parts Catalog—*B35-N360-12* Fallbrook Technologies Inc. 2012, 11 pages.

NuVinci® N360 Technical Manual. *B35-N360-02* Fallbrook Technologies Inc. 2012, 15 pages.

NuVinci® N360 Test Summary. Fallbrook Technologies Inc. 2010, 1 page.

NuVinci® Range and Gear Inch Comparison, NuVinci N360. Date unknown. 1 page.

Pohl, Brad, et al. "Configuration Analysis of a Spherical Traction Drive CVT/IVT". Fallbrook Technologies. Date unknown, 6 pages.

Non-Final Office Action of Corresponding U.S. Appl. No. 13/804,287 mailed on Mar. 13, 2014.

Notice of Allowance U.S. Appl. No. 13/828,046, mailed Jun. 16, 2014, 9 pages.

Search Report/Written Opinion of International Application Serial No. PCT/US2014/021861 mailed Jun. 4, 2014.

Final Office Action, U.S. Appl. No. 13/804,287 mailed Jun. 30, 2014.

* cited by examiner

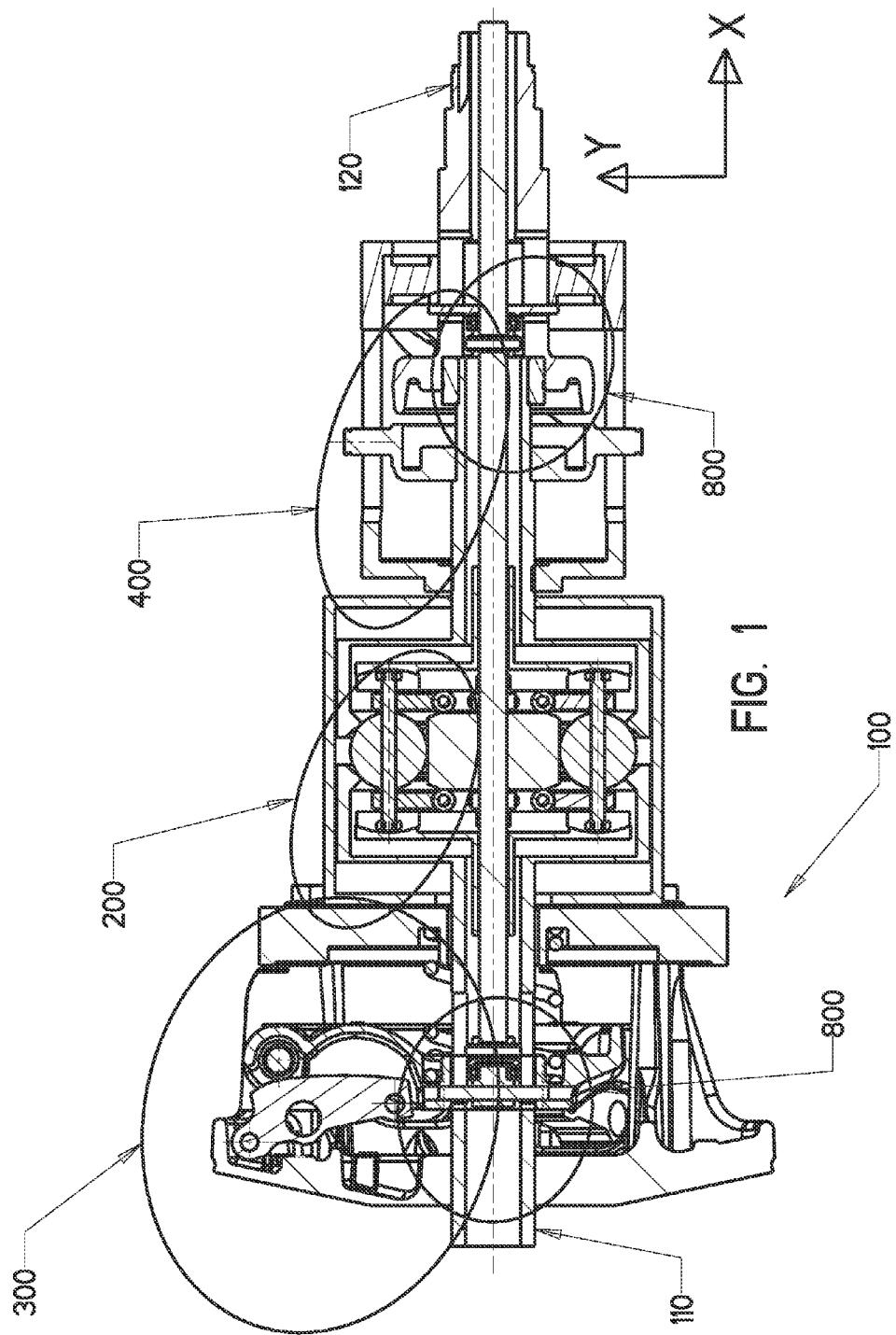

CONTINUOUSLY VARIABLE TRANSMISSION WITH AN AXIAL SUN-IDLER CONTROLLER

BACKGROUND

A continuously variable transmission (CVT) is a transmission that continuously varies a speed ratio between an output speed and an input speed. One type of a CVT is a belt-type that varies the speed ratio by varying the distance between sheaves of a pulley so the distance of the belt to a rotational axis of the pulley varies. Another type of CVT is a spherical-type that utilizes spherical speed adjusters, such as power adjusters, balls, planets, spherical gears or rollers. The spherical speed adjustors in this embodiment have tiltable axis of rotation that are adapted to be adjusted to achieve a desired ratio of input speed to output speed.

For the reasons stated above and for other reasons stated below which will become apparent to those skilled in the art upon reading and understanding the present specification, there is a need in the art for an effective and efficient method of controlling the variable shifting of a CVT.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a continuously variable transmission is provided. The continuously variable transmission includes an input assembly, an output assembly, an input/output planetary ratio assembly, an input speed feedback control assembly, a torque feedback control assembly and a shifting member. The input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio between the input assembly and the output assembly. The input speed feedback control assembly is configured and arranged to provide an axial speed force in response to a rotation from the input assembly on a shift rod. The torque feedback control assembly is configured and arranged to provide an axial load force on the shift rod in an opposite direction from the axial speed force in response to a torque of a load coupled to the output assembly. The shifting member is coupled to the shift rod. The shifting member is further configured and arranged to control the input/output planetary ratio assembly based on the position of the shift rod.

In another embodiment, another continuously variable transmission is provided. The continuously variable transmission includes an input assembly, an output assembly, an input/output planetary ratio assembly, an input speed feedback control assembly, a torque feedback control assembly and a shifting member. An input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio between the input assembly and the output assembly. The input/output planetary assembly has a first carrier having a first central passage and a second carrier having a second central passage and plurality of planets rotationally engaged between the first and second carriers. The shift rod extends through the first central passage of the first carrier and the second central passage of the second carrier. The input speed feedback control assembly is configured and arranged to provide an axial speed force in response to a rotation from the input assembly on a shift rod. The torque feedback control assembly is configured and arranged to provide an axial load force on the shift rod in an opposite direction from the axial speed force in response to a torque of a load coupled to the output assembly. In addition, the shifting member is coupled to the shift rod. The shifting member is positioned to rotate the planets between the first carrier and the second carrier based on a position of the shift rod to control the input/output planetary ratio assembly.

In still another embodiment, another continuously variable transmission is provided. The continuously variable transmission includes an input assembly, an output assembly, an input/output planetary ratio assembly, an input seed feedback control assembly, a torque feedback control assembly and a shifting member. The input assembly is configured to be coupled to receive input rotational motion. The output assembly is used to provide a rotational output, the output assembly configured to be rotationally coupled to a load. The input/output planetary ratio assembly is configured and arranged to set an input to output speed ratio between the input assembly and the output assembly. The input/output planetary assembly has a first carrier having a first central passage and a second carrier having a second central passage and plurality of planets rotationally engaged between the first and second carriers via axles. The input/output planetary ratio assembly further includes at least one set of legs coupled to at least one axle. The shift rod extends through the first central passage of the first carrier and the second central passage of the second carrier. The input speed feedback control assembly is configured and arranged to provide an axial speed force in response to a rotation from the input assembly on a shift rod. The torque feedback control assembly is configured and arranged to provide an axial load force on the shift rod in an opposite direction from the axial speed force in response to a torque of a load coupled to the output assembly. The shifting member is coupled to the shift rod. The shifting member is positioned to engage the at least one set of legs of the at least one axle based on a position of the shift rod to control the input/output planetary ratio assembly.

BRIEF DESCRIPTION OF THE DRAWINGS

The present invention can be more easily understood and further advantages and uses thereof will be more readily apparent, when considered in view of the detailed description and the following figures in which:

FIG. 1 is a cross-sectional diagram of a continuously variable transmission (CVT) of one embodiment of the present invention;

In accordance with common practice, the various described features are not drawn to scale but are drawn to emphasize specific features relevant to the present invention. Reference characters denote like elements throughout Figures and text.

DETAILED DESCRIPTION

Figure 2A:
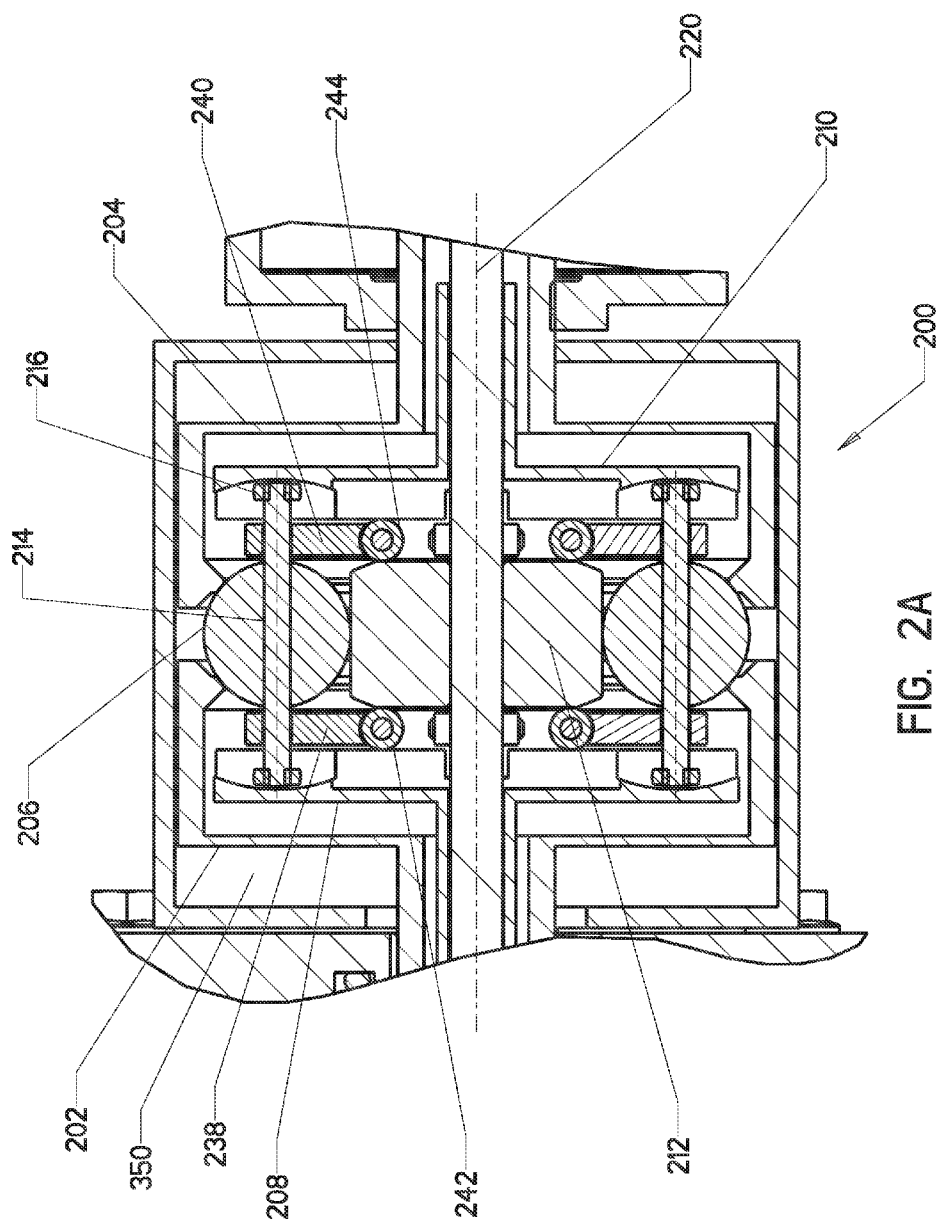
FIG. 2A is a cross-sectional side view of the input/output planetary ratio assembly of the CVT of FIG. 1.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a continuously variable transmission (CVT) 100 that includes a novel shifting assembly. A cross-sectional side view of the CVT 100 is illustrated in FIG. 1. The CVT 100 of this embodiment is also known as a continuously variable planetary. Elements of the CVT 100 include an input assembly 110 which is connected directly or indirectly to a crankshaft of an engine to receive rotational motion. The CVT 100 also includes an output assembly 120 that is connected directly or indirectly to a load, such as, tires of a vehicle. Input speed feedback control assembly 300 includes part of a shifting mechanism that is connected directly or indirectly to the crankshaft of the engine. Torque feedback control assembly 400 includes part of the shifting mechanism that is connected directly or indirectly to the load. Further, torque feedback control assembly 400 is part of the shifting mechanism that takes the phase relationship of two subsequently detailed spiders to control the axial position of the shift control assembly 800 of the CVT 100. Shift control assembly 800 is part of the shifting mechanism that takes the axial position of the input speed feedback control assembly 300 and/or torque feedback control assembly 400 to control the shifting mechanism inside the input/output planetary ratio assembly 200 of the CVT 100. An input/output planetary ratio assembly 200 transfers rotational motion from the input assembly 110 to the output assembly 120. In an embodiment, the input/output ratio assembly 200 is an input/output planetary assembly 200. The CVT 100 changes the rotational input at the input assembly 110 to a rotational output at the output assembly 120 by a select ratio. Common example ratios for CVT devices have a range of 2:1 under-drive to 0.5:1 overdrive. What this means is that if the input has 2,000 RPM and 200 ft-lbs of torque, at the 2:1 underdrive, the output will have 1,000 RPM and 400 ft-lbs of torque. Conversely at a 0.5:1 overdrive, the output will have 4,000 RPM and 100 ft-lbs of torque. These numbers are provided without consideration of efficiency losses. Also, although the ratios set put above are common examples, other ratios can be used depending on the application.

Figure 2B:
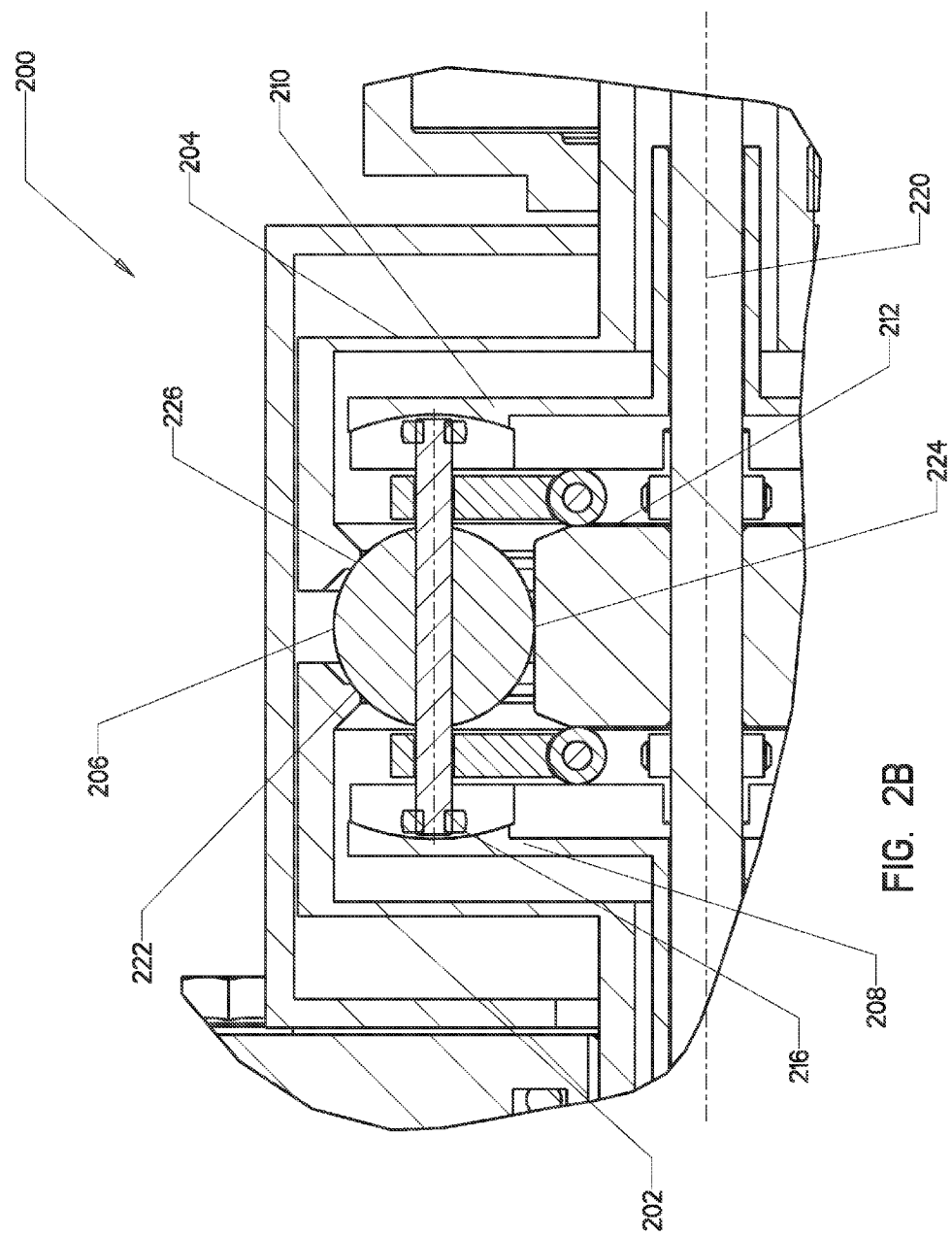
FIG. 2B is a cross-sectional side view of a portion of the input/output planetary ratio assembly of FIG. 2A.

FIG. 2A illustrates the input/output planetary ratio assembly 200 of the CVT 100. Torque comes into the input/output planetary ratio assembly 200 from the input assembly 110 via the first traction ring 202. The input assembly 110 and the first traction ring 202 are operatively connected and rotate about axis 220. The first traction ring 202 contacts a planet 206 at contact point 222 as illustrated in the close up view provided in FIG. 2B. The rotation of the first traction ring 202 causes planets 206 to individually spin about axis 236 of their axles 214 and as a group about the input/output assembly axis 220. At contact point 224, the planet 206 contacts a sun idler 212 and spins the sun idler 212 about the axis 220 of the input/output planetary ratio assembly 200. The input/output planetary ratio assembly 200 has a relatively large clamping load that clamps the two traction rings 202 and 204 together. The reaction force from this clamping load goes through the traction rings 202 and 204 into the planets 206 and eventually to the sun idler 212. With multiple planets 206 this load gets equalized about the axis 220 of the input/output planetary ratio assembly 200. At contact point 226 the planet 206 contacts and spins the second traction ring 204 which is operatively coupled to the output assembly 120 of the CVT 100. The torque path of the CVT 100 is from the input assembly 110 to the first traction ring 202, to the planet 206, then to the second traction ring 204, through the cam mechanism 400 (described below), and eventually out of the device through the output assembly 120. The points of contact between the parts are 222 to 224 to 226 as illustrated in the close up view of FIG. 2B. Traction fluid 350 in the input/output planetary ratio assembly 200 along with the clamping load between the traction rings 202 and 204 allows torque and RPM to be transmitted from the input assembly 110 to the output assembly.

Figure 2C:
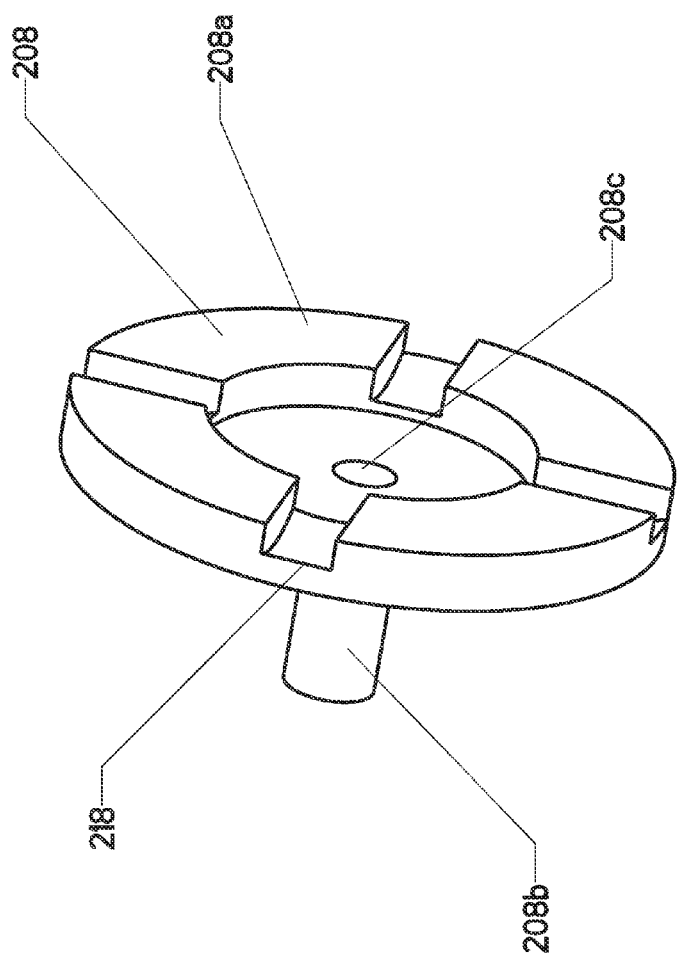
FIG. 2C is a front perspective view of a first carrier of the input/output planetary ratio assembly of FIG. 2B.

Referring to FIG. 2C, carrier 208 is illustrated. As illustrated, carrier 208 includes a disk portion 208a and a central passage 208c. Extending from the disk portion 208a is a sleeve 208b that is aligned with the central passage 208c. The sleeve is mounted on the shift rod 802 described below. Carrier 210 is a mirror image of carrier 208. As discussed above, the planet 206 spins about axis 236 of axle 214. Rollers 216 (or bearings or caps) are positioned on ends of axle 214. The rollers 216 fit in tracks 218 (best illustrated in FIG. 2C) in a first carrier 208. The second carrier 210 has similar tracks that the rollers 216 fit into. In one embodiment, the tracks of the second carrier 210 are parallel and in phase with the tracks in the first carrier 208. A shift member 212, which is a sun idler 212 in this embodiment, is axially connected to shift rod 802. Sun idler 212 translates along the X-axis along with shift rod 802. Leg 238 and leg 240 operatively connect with axle 214. Roller 242 and 244 connect to leg 238 and 240, respectively. Leg rollers 242 and 244 are allowed to rotate about their respective axis. Planet 206 is rotatably connected to axle 214. As sun idler 212 translates, leg rollers 242 and 244 follow the sun idler and change the angle of the legs 238 and 240 as the planet 206 is constrained by the traction ring 202 and 204 via contact points 222 and 226. Thus the angle of the axle 214 changes and the axle tips changing the ratio of the CVT.

Figure 2D:
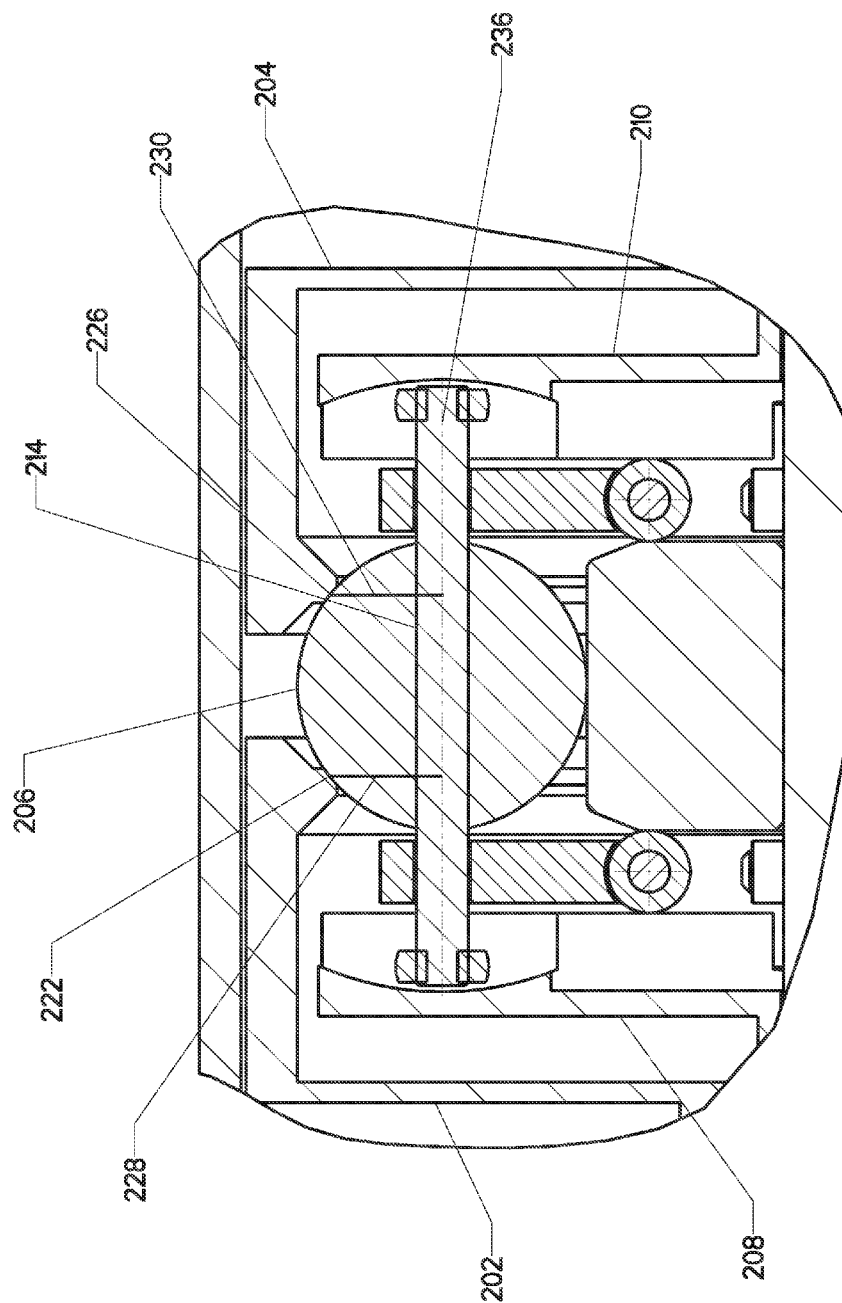
FIG. 2D is a cross-sectional side view of a portion of input/output planetary ratio assembly of FIG. 2A with an axle axis of the planet set to provide a first speed ratio.
Figure 2E:
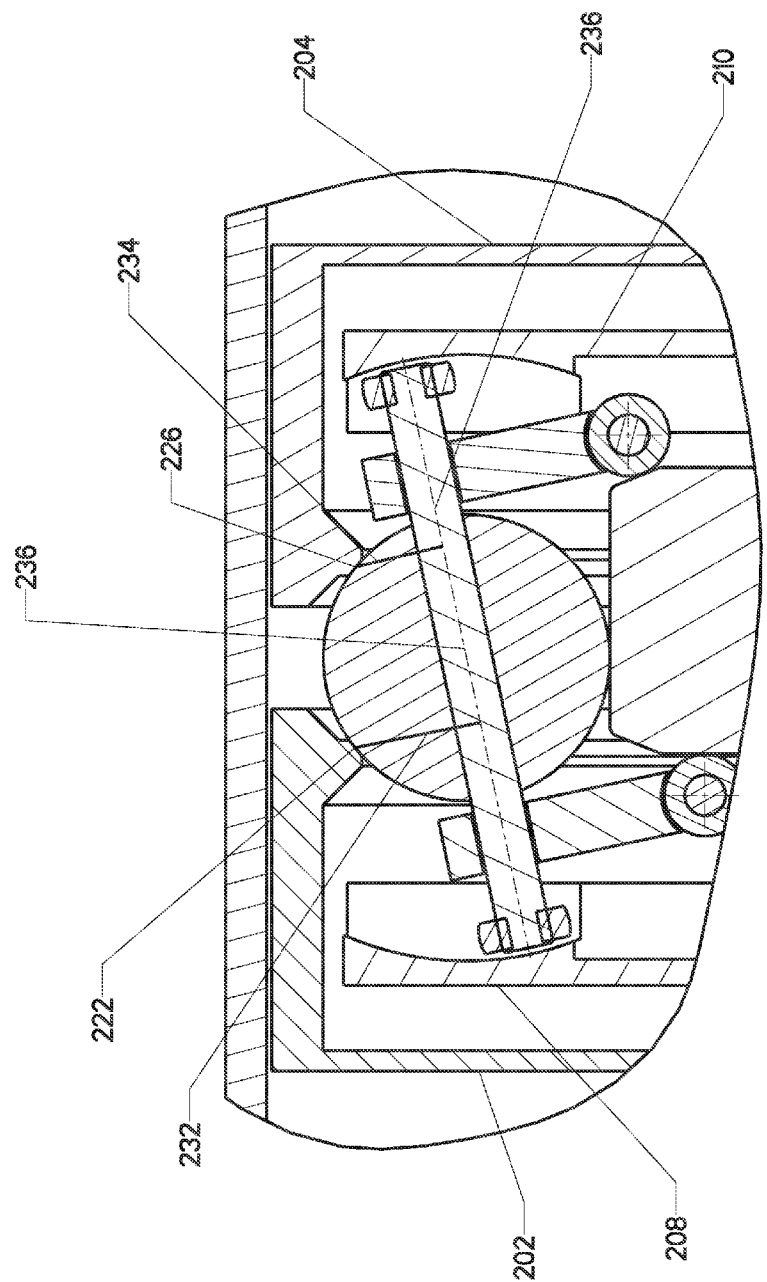
FIG. 2E is a cross-sectional side view of a portion of the input/output planetary ratio assembly of FIG. 2A with an axle axis of the planet set to provide a second speed ratio.

As discussed above, the CVT 100 can change ratio from the input to the output. The ratio is calculated by dividing a distance 228 from the contact point, 222 to the axis 236 of the axle 214 by the distance 230 from the second contact point 226 to the axis 236 of the axle 214. As shown in FIG. 2D, the device is in a 1:1 ratio. With the length of 228 and 230 being equal. Therefore, the first traction ring 202 is going the same RPM as the second traction ring 204. When the sun idler 212 translates along axis 220, the axle 214 changes angle, as show in simplified FIG. 2E. When this happens, the distance 232 from the first contact point 222 to the axis 236 of the axle 214 gets longer and the distance 234 from the third contact point 226 to the axis 236 of the axle 214 gets shorter resulting in an under-drive ratio. In this configuration, the second traction ring 204 is going slower than the first traction ring 202. Translating the sun idler 212 in the opposite direction will give you an overdrive with the planet 206 and its accompanying parts rotating such that 232 gets shorter and 234 gets longer and the second traction ring 204 will be going faster than the first traction ring, 202.

Figure 3A:
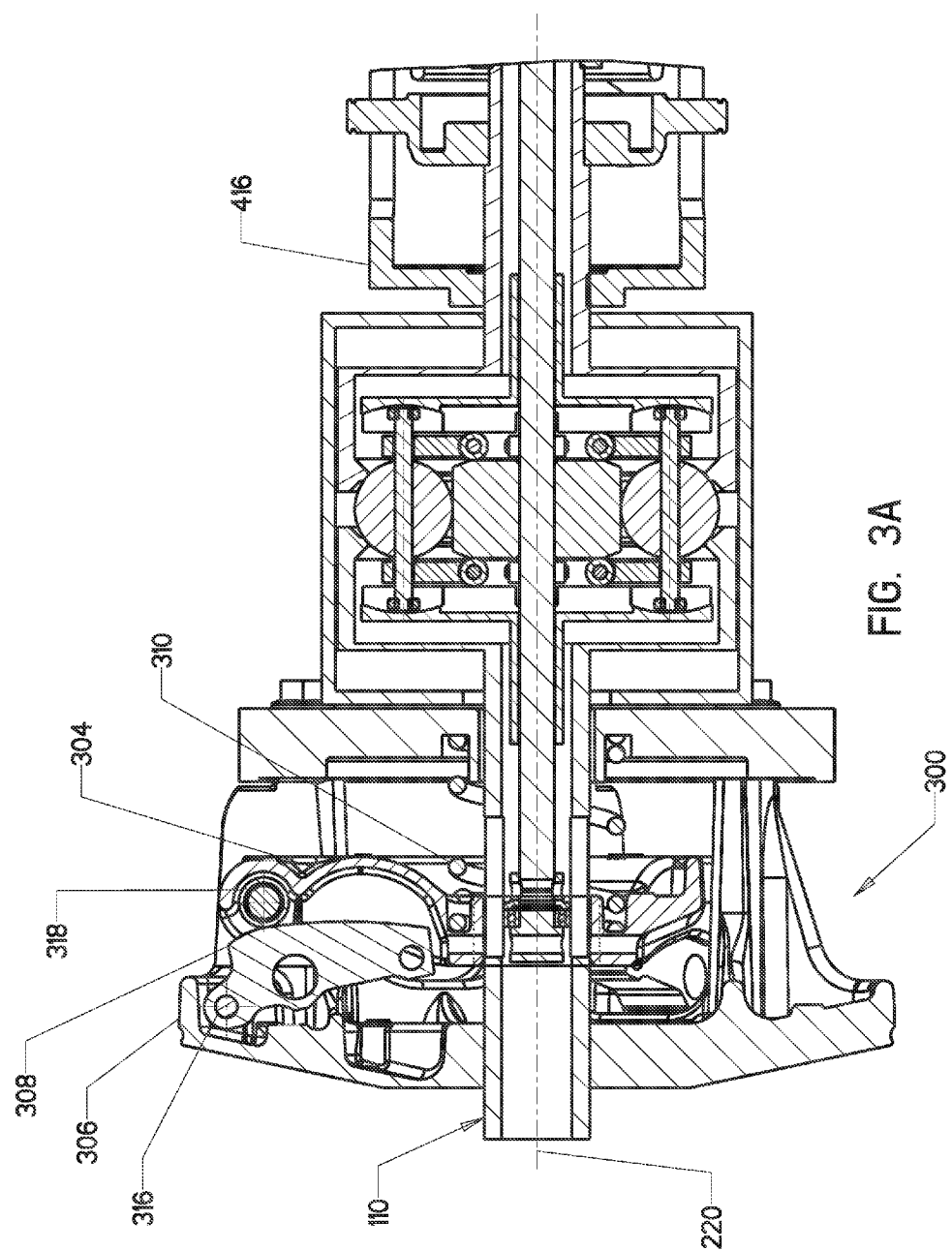
FIG. 3A is a cross-sectional side view of a input speed feedback control assembly of the CVT of FIG. 1.
Figure 3B:
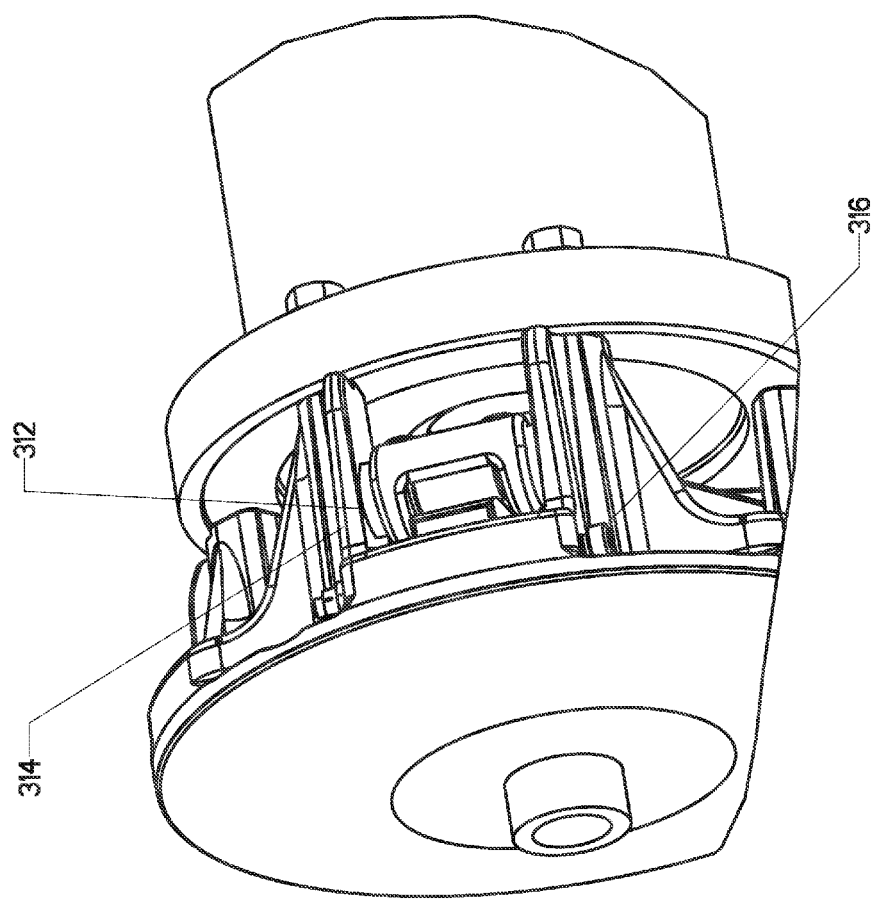
FIG. 3B is a perspective view of a portion of the input speed feedback control assembly of FIG. 3A.
Figure 3C:
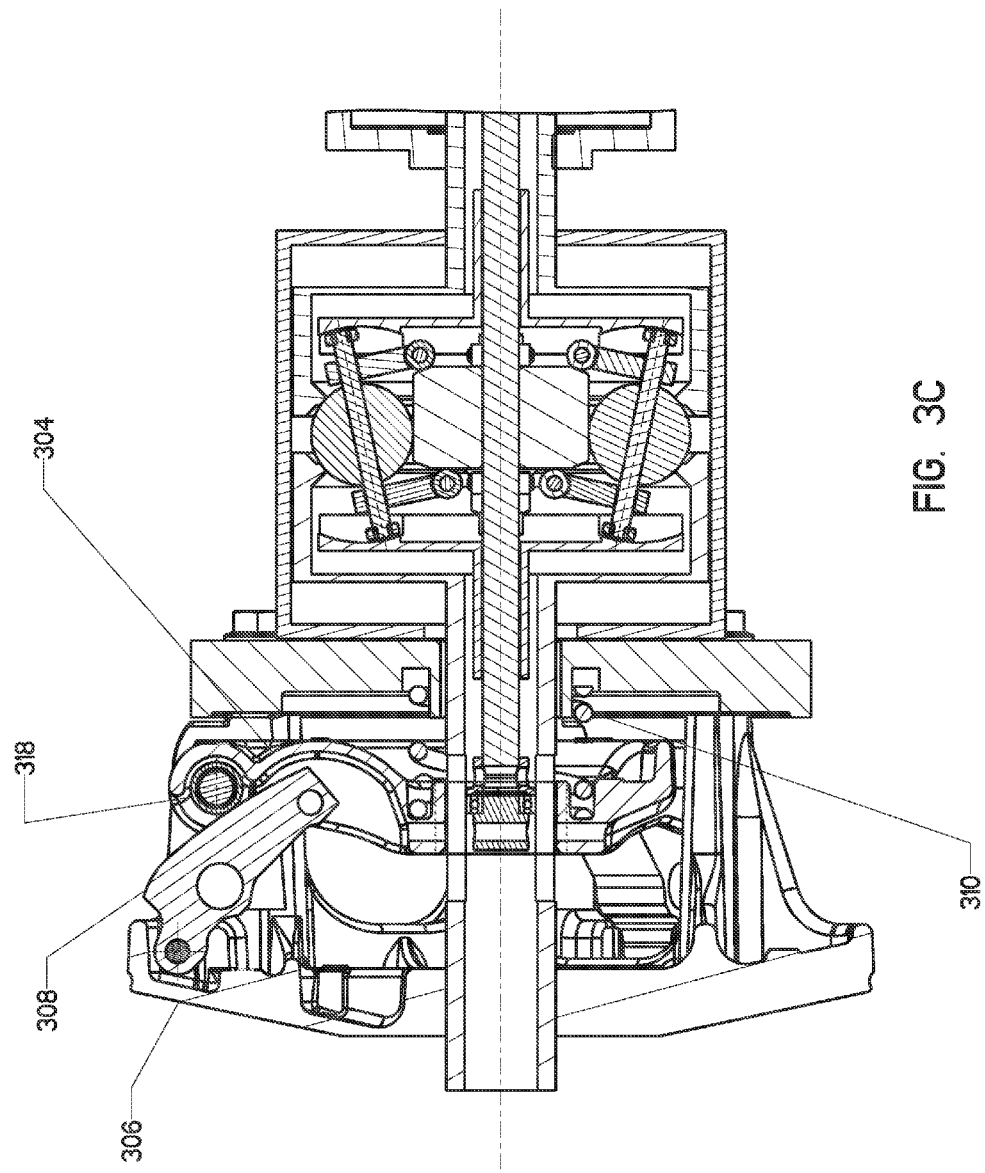
FIG. 3C is a cross-sectional side view of the input speed feedback control assembly of FIG. 3A

A mechanism that controls the translation of the sun idler 212 is described below. Referring to the input speed feedback control assembly 300 illustrated in FIG. 3A, input assembly 110 is an input to this assembly 300. Input assembly 110 may be a shaft, gear, pulley or the like. Input assembly 110 can be operatively connected directly to an engine crankshaft, or be operatively connected to the engine through a starter clutch, torque convertor, torque dampener, gear set and the like. Input assembly 110 delivers rotational motion to the input speed feedback control assembly 300. Stationary member 306 is operatively attached to input member 110. Spider 304 is rotationally connected to member 306 but slidably movable. Spider 304 includes pucks 312 (illustrated in FIG. 3B) that contact towers 314 on member 306. A shift weight 308 is pivotally attached to the assembly by pin 316. Pin 316 could be any fastener such as a pin or bolt. As the stationary member 306 of the input speed feedback control assembly 300 spins, the shift weight 308 spins about axis 220 of the input/output ratio assembly 200. The faster the member 306 spins, the more centrifugal force is asserted on the shift weight 308. The shift weight 308 is designed such that its center of gravity is above the pivot point of pin 316, so it imparts a force onto the roller 318, which is operatively connective to spider 304. The mechanics of the shift weight 308 to roller 318 creates an axial force along the X axis. The faster the input speed feedback control assembly portion 300 spins, the more axial force created by the shift weight 308. A plurality of shift weights, arranged about the axis 220, may also be utilized to the same effect. The input speed feedback control assembly 300 further includes a spring 310. The spring 310 is pre-loaded to a predetermined force. Its purpose is to bias the input speed feedback control assembly 300 in "low ratio" which is shown in FIG. 3A. Additionally, a spring pre-loaded to a pre-determined force may be placed anywhere in the system with the purpose of biasing the input/output planetary ratio assembly 200 towards "low ratio." As the input speed feedback control assembly 300 spins faster, the shift weight 308 creates more axial force. Once this axial force gets higher than the spring force, spider 304 starts to move towards the cam 416 of the torque feedback control assembly 400 and will shift the input/output ratio assembly 200 of the CVT into a higher ratio. This shifting is further described below. FIG. 3C depicts the input speed feedback control assembly 300 in "high ratio". The input to output torque path for this embodiment goes through the input/output ratio assembly 200 and into the torque feedback control assembly 400. The axial force created by the input speed feedback control assembly 300 gets transmitted to the torque feedback control assembly 400 through shift control assembly 800.

In an additional embodiment, shift-weights that travel radially between the spider and the stationary member produce a centrifugal radial force as a function of input rotational speed that is transformed into an axial force as a result of the angles of contact between the shift-weights and the spider and stationary member. In yet another embodiment a generator output such as a magneto electrically operatively connected to an electromagnetic actuator such as a DC motor or solenoid exerts an axial force in opposing direction to the torque feedback control assembly. In yet another embodiment an electronic proximity sensor such as a hall-effect, reed, variable reluctance can be interfaced with a microprocessor to detect and calculate input shaft rotational rate and deliver an electrical power signal to an electrically controlled actuator. This electrical power signal may be a linear or non-linear function of input shaft rotational rate. The algorithm may also be a function of atmospheric barometric pressure in order to compensate for engine power output changes that occur as a result of altitude changes. An electrically controlled actuator may apply an axial force directly or indirectly to the torque feedback control assembly or may control a valve in a hydraulic circuit that regulates the hydraulic pressure and thus control the axial force. An electrically controlled actuator may apply piston hydraulic pressure that is in communication with a piston that may exert an axial force in opposing direction to the torque feedback control assembly 400. A hydraulic pump, driven at a rotational rate proportional to the input shaft assembly 110, that is in communication with a piston and valve may exert an axial force in opposing direction to the torque feedback control assembly 400.

Figure 4A:
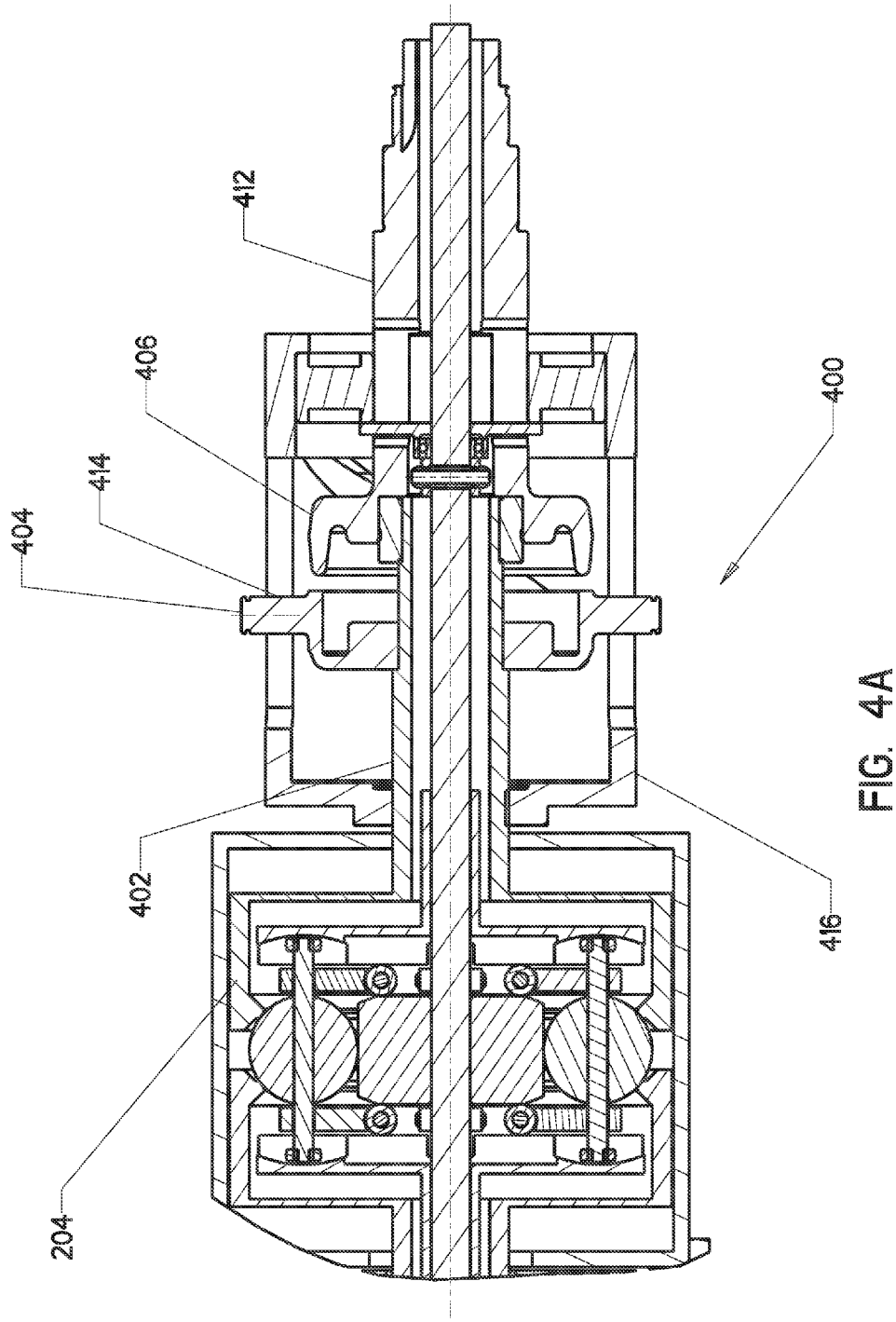
FIG. 4A is a cross-sectional side view of the torque feedback control assembly of the CVT of FIG. 1.
Figure 4B:
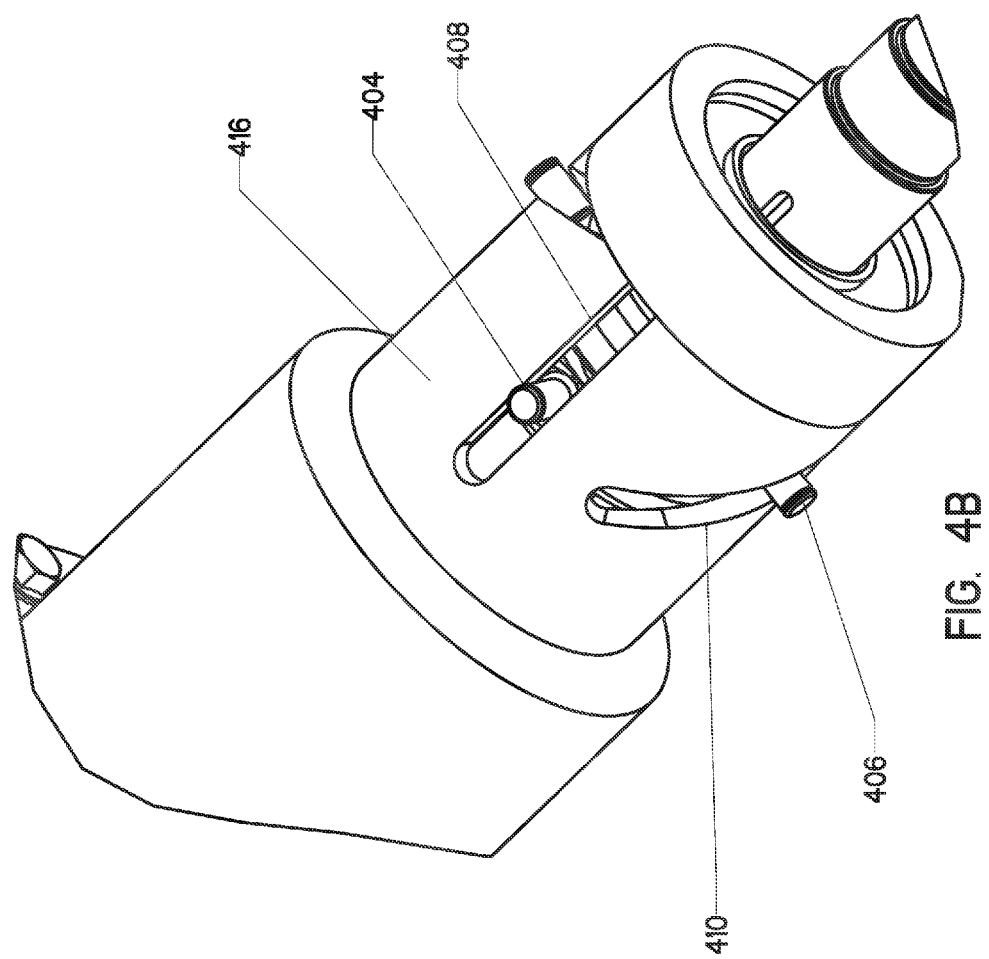
FIG. 4B is a perspective view of the torque feedback control assembly of FIG. 4A and a partial perspective view of the helical shift control assembly of the CVT of FIG. 1.

Input/output ratio shaft 402 is the output shaft from the input/output planetary ratio assembly 200. Input/output ratio shaft 402 is operatively connected to a second traction ring 204 as best illustrated in FIG. 4A. Input/output ratio shaft 402 transmits torque and rotational motion. As illustrated in FIG. 4A, shaft 402 goes into the torque feedback control assembly 400. The purpose of the torque feedback control assembly 400 is to transmit torque and using this vehicle torque, create a proportional axial force along the X axis back to the input speed feedback control assembly 300. The cam's axial location dictates the axial location of the sun idler 212 which controls the shifting mechanism inside the input/output planetary ratio assembly 200. The torque comes into the torque feedback control assembly 400 from Input/output ratio shaft 402. This shaft 402 is operatively connected to the cam 416 through the first spider 404. This first spider 404 transmits torque to a first straight (or generally straight) set of tracks 408 as best illustrated in FIG. 4B. The torque and rotational motion are then in the cam 416 of the torque feedback control assembly 400. This torque and rotational motion then go to a second set of helix tracks 410 and to a second spider 406. Because the first set of tracks 408 are straight in the cam 416, there is little to no axial force. Because of the helical nature of second set of tracks 410 in the cam 416, an axial force is created in the contact area with the second spider 406. Rollers could be put on the spider pins 414 to reduce friction. Cap 422 is connected to cam 416. This axial force opposes, through shift control assembly 800, the force created by the input speed feedback control assembly 300. Therefore the lower the torque load from the vehicle, the lower the axial force created by the torque feedback control assembly 400 and the higher the torque load from the vehicle, the higher the axial force created by the torque feedback control assembly 400. The torque and rotational motion then goes from the second spider 406 into the CVT output shaft 412 as they operatively connected. Output shaft 412 is operatively connected to the load, such as the tires of a vehicle. The first and second spider functions are interchanged in another embodiment. Moreover, other ways of accomplishing the functions of the cam and spider functions are contemplated such as having a cut track in a shaft with a cam follower connected to the cam. The torque and rotational motion are operatively connected to the load, such as the tires of a vehicle. Forces between the input speed feedback control assembly 300 and torque feedback control assembly 400 balance at a unique axial location for any given combination of input speed and output torque.

Figure 5A:
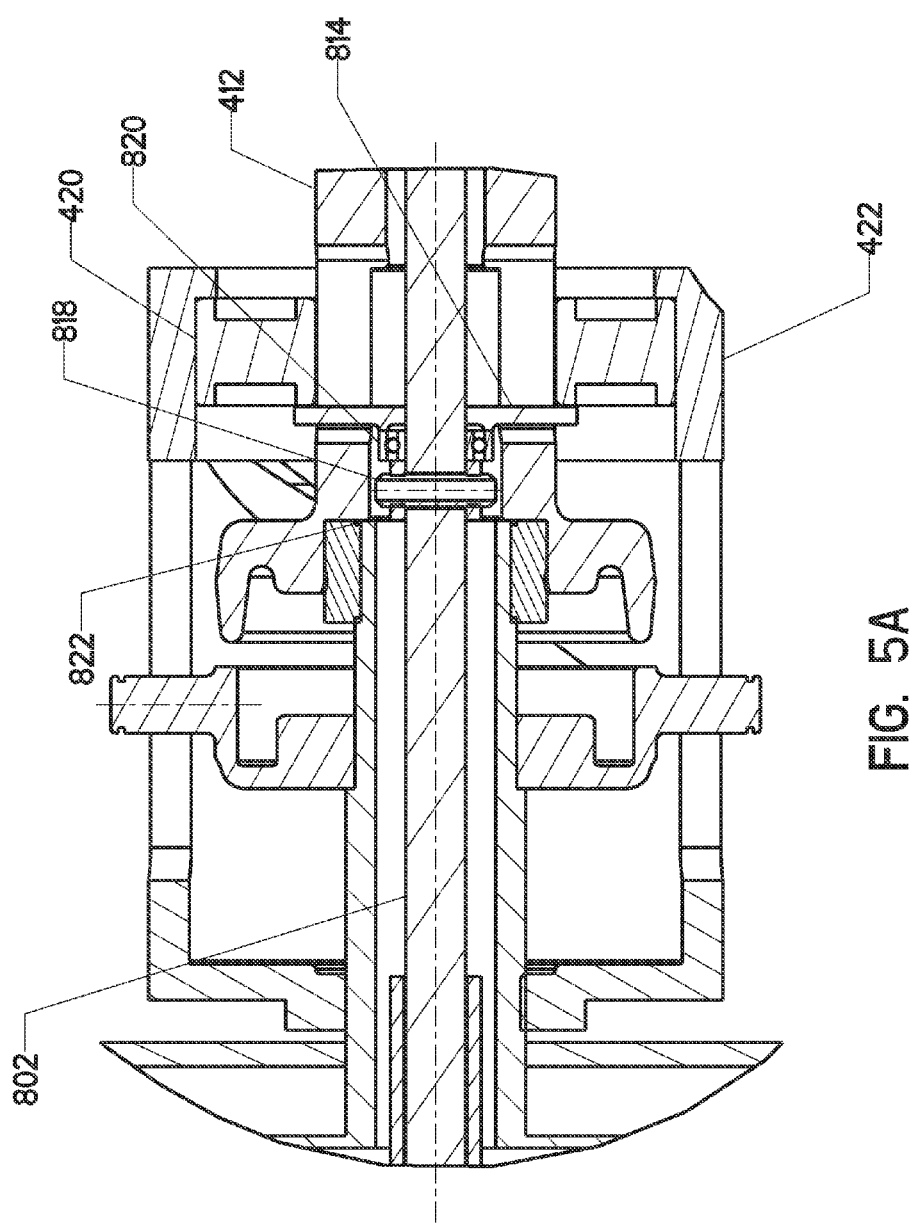
FIG. 5A is a cross-sectional partial side view of the shift control assembly of the CVT of FIG. 1.
Figure 5B:
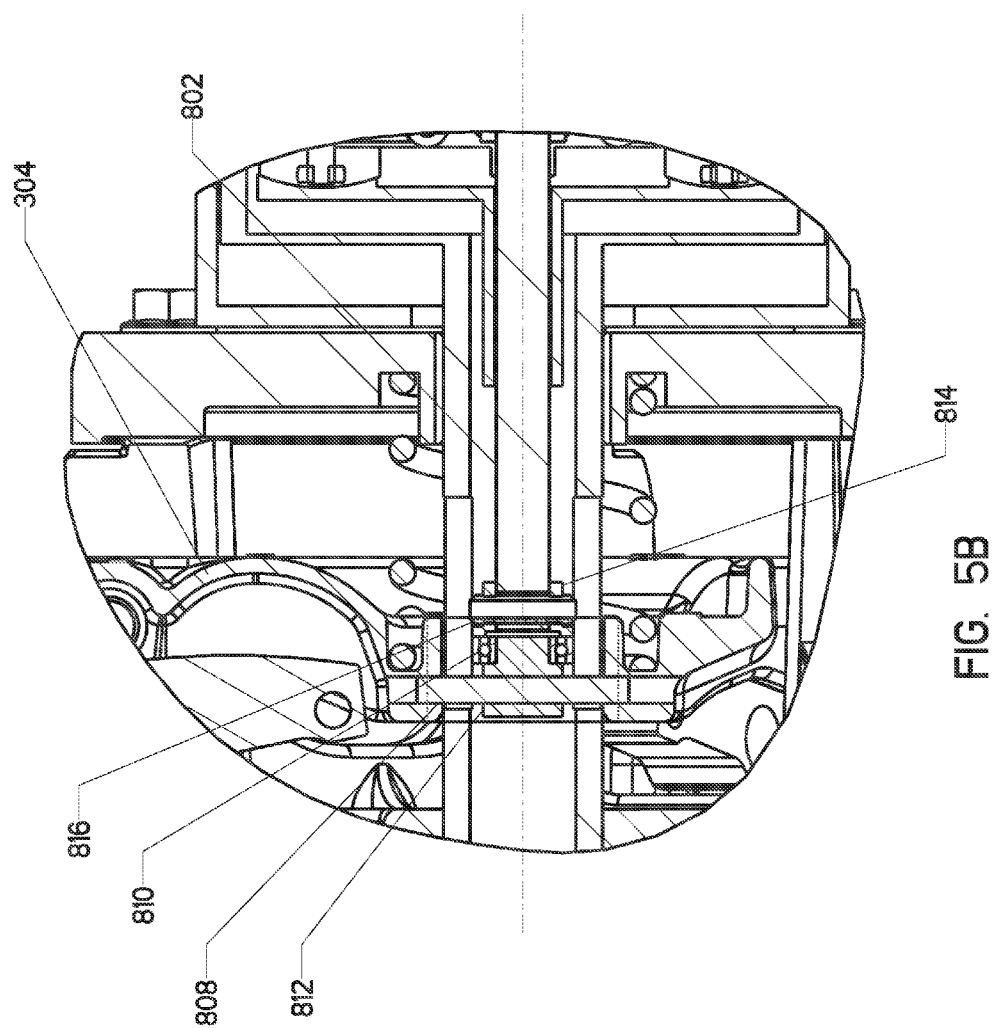
FIG. 5B is a cross-sectional partial side view of the shift control assembly of the CVT of FIG. 1.

If you have relatively high engine speed, you have relatively high input speed feedback control assembly 300 speed and relatively high axial force. For a given input RPM, if the load increases (i.e. more torque is transmitted through the torque feedback control assembly 400) a larger axial force will be created, opposing the input speed feedback control assembly 300, the torque feedback control assembly 400 moves until forces balance. This change in axial location of the torque feedback control assembly 400 results in an axial location change in the shift control assembly 800 which in turn results in an axial location change in sun idler 212 that results in a change in CVT ratio. The shift control assembly 800 illustrated in FIG. 5A shows the connection between the input speed feedback control assembly 300 and the shift control assembly 800. Spider 304 is connected to collar 812 through pin 808 (as illustrated in FIG. 5B). Collar 812 pushes against bearing 810 which pushes against collar 814. Collar 814 is connected to the shift rod 802 by pin 816. The axial force and axial translation from spider 304 gets transmitted through these parts into shift rod 802. FIG. 5B shows the connection between the torque feedback control assembly 400 and the shift control assembly 800. CVT output shaft 412 (shown in FIG. 4A) is radially but not axially connected to plate 814. The axial force and axial translation from torque feedback control assembly 400 transfers from cap 422 through bearing 420 and into plate 814 (as best shown in FIG. 5A). Plate 814 pushes against bearing 820 which pushes against collar 822. Collar 822 is connected to the shift rod 802 by pin 818. As the force balance between input speed feedback control assembly 300 and torque feedback control assembly 400 occurs, the axial location of these two assemblies changes, causing a change in axial location of shift control assembly 800. Due to the fact that shift rod 802 is axially connected to sun/idler 212 (shown in FIG. 2B), the axial location of the sun/idler 212 changes and hence the ratio of the input/output planetary ratio assembly 200 changes.

The preferred embodiments have been shown and described above. An additional embodiment interchanges the straight 408 and helical 410 tracks. Additionally the two tracks may both be helical with different angles where the difference in the angles will provide the phase change between the two spiders 404 and 406. Moreover, additional embodiments include using splines, screw threads, face cams, ball-ramp cams or tracks cut into the operative shafts along with cam followers, mating splines, mating threads to realize the function of the spiders and straight and helical tracks previously described.

Figure 6:
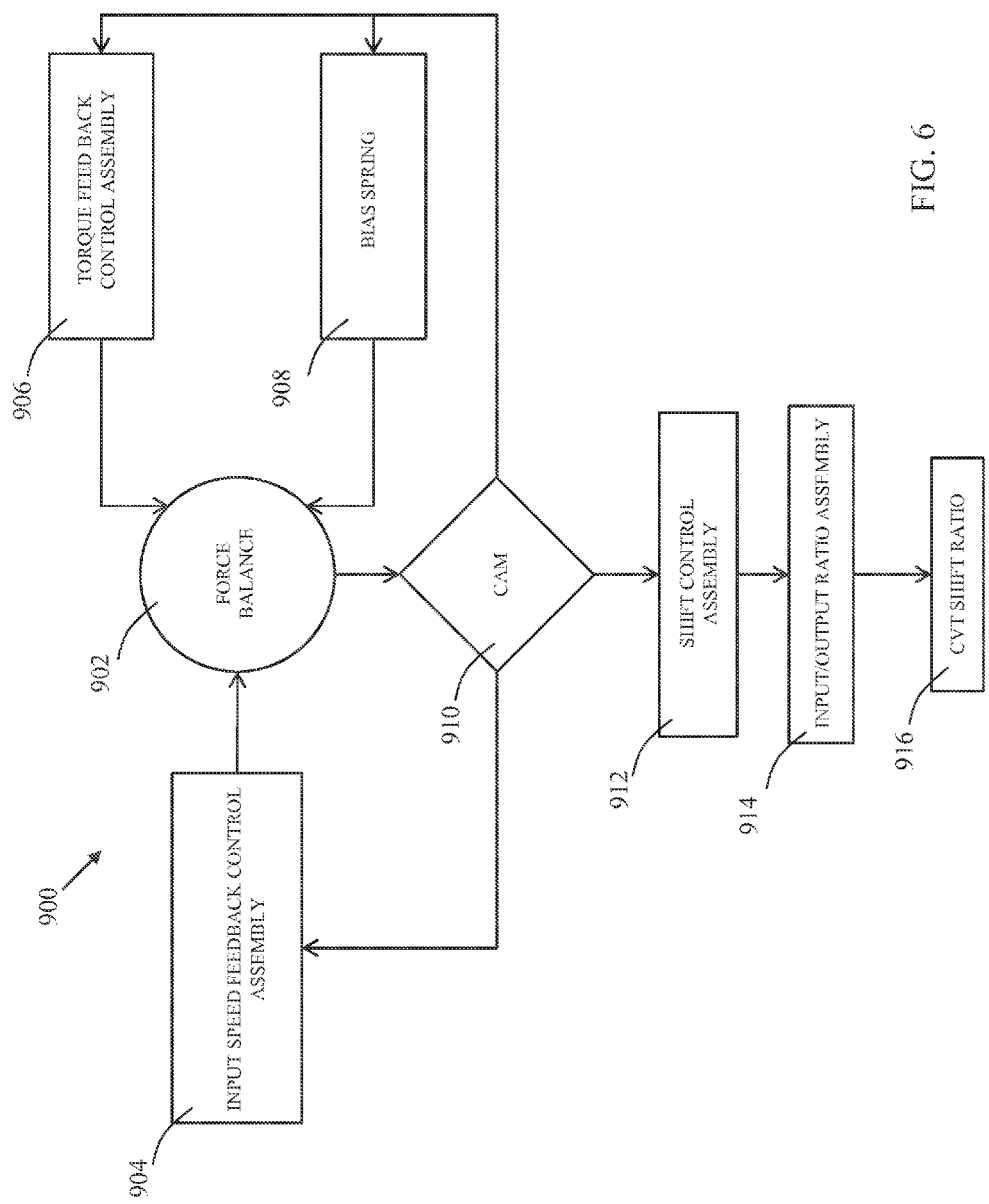
FIG. 6 is a functional block diagram of the CVT of FIG. 1.

FIG. 6 is a functional block diagram 900 of the present invention. Input speed feedback control assembly 904 produces a translational force as a linear or non-linear function of input shaft 110 rotational rate and as a constant, linear or non-linear function of translational position. Torque feedback control assembly 906 produces a translational force as a linear or non-linear function of output shaft 120 torque and as a constant, linear or non-linear function of translational position. Bias spring 908 produces a force as a constant, linear, or non-linear function of translational position. Translational force balance 902 outputs a translational position of cam 910 in accordance with the following equation:

Input Speed Feedback Control Assembly Force[Input Assembly 110 Rotational Speed,Translational Position]−Torque Feedback Control Assembly Force[Output Assembly 120 Torque,Translational Position]−Bias Spring Force[Translational Position]=0.

The input speed feedback control assembly 904, the torque feedback control assembly 906, the bias spring 908 and the cam 910 are translationally operatively connected. The translational position of cam 910 dictates the translational position of the shift control assembly 912, which outputs a phase relationship of the first and second carriers of a input/output planetary ratio assembly 914 that in turn dictates a specific shift ratio of a CVT 916.

In summary, as the force balance of the input speed feedback control assembly 300 and torque feedback control assembly 400 balance at a particular axial location, the shift control assembly 800 is correspondingly axially located, and in response sun idler 212 changes axial location, and the CVT 100 changes ratio. In embodiments, shifting of the CVT 100 is accomplished with an input speed feedback control assembly 300 that uses rotational motion from an engine or other input to create an axial force that force balances with a torque feedback control assembly 400 that is operatively connected to the torque load, such as the tires of a vehicle. This shifting design has applications to other transmission devices such as Infinitely Variable Transmission (IVT) of similar designs as well as a CVT system where the input and output are both coaxial to the CVT 100 and on the same side of the CVT 100.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission comprising:
   an input assembly configured to be coupled to receive input rotational motion;
   an output assembly to provide a rotational output, the output assembly configured to be rotationally coupled to a load;
   an input/output planetary ratio assembly configured and arranged to set an input to output speed ratio between the input assembly and the output assembly;
   an input speed feedback control assembly configured and arranged to provide an axial speed force in response to a rotation from the input assembly on a shift rod;
   a torque feedback control assembly configured and arranged to provide an axial load force on the shift rod in an opposite direction from the axial speed force in response to a torque of a load coupled to the output assembly; and
   a shifting member coupled to the shift rod, the shifting member further configured and arranged to control the input/output planetary ratio assembly based on a position of the shift rod.

2. The continuously variable transmission of claim 1, wherein the shifting member is a sun idler received within the input/output planetary ratio assembly.

3. The continuously variable transmission of claim 2, wherein the input/output planetary ratio assembly further comprises:
   a first carrier having a first disk portion with a plurality of first tracks;
   a second carrier having a second disk portion with a plurality of second tracks;

a plurality of planets movably engaged between the first and second carrier;

an axle extending through an axis of each planet;

rollers coupled to first and second ends of each axle, the first end of each axle received in one of the first tracks of the first carrier and the second end of each axle received in one of the second tracks of the second carrier; and at least one set of legs coupled to at least one axle, the sun idler operationally engaged with the at least one set of legs such that a translation movement of the sun idler moves the legs to change an angle of the at least one axle therein shifting the input/output planetary ratio assembly.

4. The continuously variable transmission of claim 3, further comprising:

a first traction ring operationally coupled to the input assembly, the first traction ring engaging a surface of the rollers; and a second traction ring operationally coupled to the output assembly, the second traction ring engaging the surface of the rollers.

5. The continuously variable transmission of claim 1, wherein the input speed feedback control assembly further comprises:

an input shaft operationally coupled to the input assembly;

an input speed feedback control assembly spider slidably positioned along the input shaft;

a stationary member operationally coupled to the input shaft; and at least one shift weight configured and arranged to assert a force on the input speed feedback control assembly spider such that as the input speed feedback control assembly spins an axial force is generated to axially move the spider along the input shaft to apply the axial speed force on the shift rod.

6. The continuously variable transmission of claim 5, further comprising:

a biasing member providing a biasing force on the spider to prevent axial movement of the spider until a select axial force is reached by the spider to bias the input speed feedback control assembly in a low ratio.

7. The continuously variable transmission of claim 1, wherein the torque feedback control assembly further comprises:

an input/output ratio shaft operationally coupled to the input/output ratio assembly;

a cam slidably mounted on the input/output ratio shaft, the cam in operational communication with a movable member of the input speed feedback control assembly, the cam having a first set of tracks and a second set of tracks, the second set of tracks being in a non-parallel configuration in relation to the first set of tracks;

a first cam spider, the first cam spider operationally connected to the input/output ratio output shaft, at least a portion of the first cam spider received in the first set of tracks of the cam, the first cam spider transmitting torque to the cam via the at least a portion of the first cam spider in the first set of tracks; and a second cam spider, the second cam spider operationally connected to an output shaft of the output assembly, at least a portion of the second cam spider received in the second set of tracks, wherein the second cam spider rotates relative to the first spider which operates in the first set of tracks causing a phase change between first and second spiders when a change in axial position of the torque feedback control assembly occurs.

8. The continuously variable transmission of claim 7, wherein the first set of tracks are straight and the second set of tracks are helical.

9. The continuously variable transmission of claim 7, wherein the first set of tracks are helical and the second set of tracks are straight.

10. The continuously variable transmission of claim 7, wherein the first set of tracks are helical and the second set of tracks are helical.

11. The continuously variable transmission of claim 7, further comprising:

a cap coupled to the cam, the cap operationally engaging the shift rod to apply the axial load force on the shift rod.

12. A continuously variable transmission comprising:

an input assembly configured to be coupled to receive input rotational motion;

an output assembly to provide a rotational output, the output assembly configured to be rotationally coupled to a load;

an input/output planetary ratio assembly configured and arranged to set an input to output speed ratio between the input assembly and the output assembly, the input/output planetary assembly having a first carrier having a first central passage and a second carrier having a second central passage and plurality of planets rotationally engaged between the first and second carriers;

a shift rod extending through the first central passage of the first carrier and the second central passage of the second carrier;

an input speed feedback control assembly configured and arranged to provide an axial speed force in response to a rotation from the input assembly on the shift rod;

a torque feedback control assembly configured and arranged to provide an axial load force on the shift rod in an opposite direction from the axial speed force in response to a torque of a load coupled to the output assembly; and a shifting member coupled to the shift rod, the shifting member positioned to rotate an axis of rotation of the planets between the first carrier and the second carrier based on a position of the shift rod to control the input/output planetary ratio assembly.

13. The continuously variable transmission of claim 12, wherein the input/output planetary ratio assembly further comprises:

the first carrier having a first disk portion with a plurality of first tracks;

the second carrier having a second disk portion with a plurality of second tracks;

the plurality of planets movably engaged between the first and second carriers;

an axle extending through an axis of each planet;

rollers coupled to first and second ends of each axle, the first end of each axle received in one of the first tracks of the first carrier and the second end of each axle received in one of the second tracks of the second carrier;

at least one set of legs coupled to at least one axle; and wherein the shifting member is a sun idler, the sun idler operationally engaged with the at least one set of legs such that a translation movement of the sun idler moves the legs to change an angle of the at least one axle therein shifting the input/output planetary ratio assembly.

14. The continuously variable transmission of claim 12, further comprising:

a first traction ring operationally coupled to the input assembly, the first traction ring engaging a surface of the rollers; and a second traction ring operationally coupled to the output assembly, the second traction ring engaging the surface of the rollers.

15. The continuously variable transmission of claim 12, wherein the input speed feedback control assembly further comprises:
an input shaft operationally coupled to the input assembly;
an input speed feedback control assembly spider slidably positioned along the input shaft;
a stationary member operationally coupled to the input shaft; and
at least one shift weight configured and arranged to assert a force on the input speed feedback control assembly spider such that as the input speed feedback control assembly spins an axial force is generated to axially move the spider along the input shaft to apply the axial speed force on the shift rod.

16. The continuously variable transmission of claim 12, wherein the torque feedback control assembly further comprises:
an input/output ratio shaft operationally coupled to the input/output ratio assembly;
a cam slidably mounted on the input/output ratio shaft, the cam in operational communication with a movable member of the input speed feedback control assembly, the cam having a first set of tracks and a second set of tracks, the second set of tracks being in a non-parallel configuration in relation to the first set of tracks;
a first cam spider, the first cam spider operationally connected to the input/output ratio output shaft, at least a portion of the first cam spider received in the first set of tracks of the cam, the first cam spider transmitting torque to the cam via the at least a portion of the first cam spider in the first set of tracks; and
a second cam spider, the second cam spider operationally connected to an output shaft of the output assembly, at least a portion of the second cam spider received in the second set of tracks, wherein the second cam spider rotates relative to the first spider which operates in the first set of tracks causing a phase change between first and second spiders when a change in axial position of the torque feedback control assembly occurs.

17. The continuously variable transmission of claim 12, further comprising:
a cap coupled to the cam, the cap operationally engaging the shift rod to apply the axial load force on the shift rod.

18. A continuously variable transmission comprising:
an input assembly configured to be coupled to receive input rotational motion;
an output assembly to provide a rotational output, the output assembly configured to be rotationally coupled to a load;
an input/output planetary ratio assembly configured and arranged to set an input to output speed ratio between the input assembly and the output assembly, the input/output planetary assembly having a first carrier having a first central passage and a second carrier having a second central passage and plurality of planets rotationally engaged between the first and second carriers via axles, the input/output planetary ratio assembly further including at least one set of legs coupled to at least one axle;
a shift rod extending through the first central passage of the first carrier and the second central passage of the second carrier;
an input speed feedback control assembly configured and arranged to provide an axial speed force in response to a rotation from the input assembly on the shift rod;
a torque feedback control assembly configured and arranged to provide an axial load force on the shift rod in an opposite direction from the axial speed force in response to a torque of a load coupled to the output assembly; and
a shifting member coupled to the shift rod, the shifting member positioned to engage the at least one set of legs of the at least one axle based on a position of the shift rod to control the input/output planetary ratio assembly.

19. The continuously variable transmission of claim 18, wherein the torque feedback control assembly further comprises:
an input/output ratio shaft operationally coupled to the input/output ratio assembly;
a cam slidably mounted on the input/output ratio shaft, the cam in operational communication with a movable member of the input speed feedback control assembly, the cam having a first set of tracks and a second set of tracks, the second set of tracks being in a non-parallel configuration in relation to the first set of tracks;
a first cam spider, the first cam spider operationally connected to the input/output ratio output shaft, at least a portion of the first cam spider received in the first set of tracks of the cam, the first cam spider transmitting torque to the cam via the at least a portion of the first cam spider in the first set of tracks;
a second cam spider, the second cam spider operationally connected to an output shaft of the output assembly, at least a portion of the second cam spider received in the second set of tracks, wherein the second cam spider rotates relative to the first spider which operates in the first set of tracks causing a phase change between first and second spiders when a change in axial position of the torque feedback control assembly occurs; and
a cap coupled to the cam, the cap operationally engaging the shift rod to apply the axial load force on the shift rod.

20. The continuously variable transmission of claim 18, wherein the input speed feedback control assembly further comprises:
an input shaft operationally coupled to the input assembly;
an input speed feedback control assembly spider slidably positioned along the input shaft;
a stationary member operationally coupled to the input shaft; and
at least one shift weight configured and arranged to assert a force on the input speed feedback control assembly spider such that as the input speed feedback control assembly spins an axial force is generated to axially move the spider along the input shaft to apply the axial speed force on the shift rod.

* * * * *